US011636422B2

(12) United States Patent
Lau et al.

(10) Patent No.: US 11,636,422 B2
(45) Date of Patent: Apr. 25, 2023

(54) DATA VALIDATION IN A MOBILE COMMUNICATION NETWORK

(71) Applicants: AT&T Intellectual Property I, L.P., Atlanta, GA (US); AT&T Mobility II LLC, Atlanta, GA (US)

(72) Inventors: Erie Lai Har Lau, Redmond, WA (US); Russell Vegh, Atlanta, GA (US); Sangar Dowlatkhah, Plano, TX (US); John Krachenfels, Addison, TX (US); Zhi Cui, Sugar Hill, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 566 days.

(21) Appl. No.: 16/229,351

(22) Filed: Dec. 21, 2018

(65) Prior Publication Data
US 2020/0202289 A1 Jun. 25, 2020

(51) Int. Cl.
*G06Q 10/08* (2012.01)
*G06Q 10/0832* (2023.01)
*G06F 21/64* (2013.01)

(52) U.S. Cl.
CPC ........ *G06Q 10/0832* (2013.01); *G06F 21/64* (2013.01); *G06F 2221/2101* (2013.01);
(Continued)

(58) Field of Classification Search
CPC .. G06Q 10/02; G06Q 10/025; H04W 52/0238
See application file for complete search history.

(56) References Cited

U.S. PATENT DOCUMENTS 9,846,854 B1   12/2017 Lee et al.
10,068,196 B2   9/2018 Kazanchian
(Continued)

OTHER PUBLICATIONS

Tsang Y, Choy K, Wu C, Ho G, Lam H, Koo P. An IoT-based cargo monitoring system for enhancing operational effectiveness under a cold chain environment. International Journal of Engineering Business Management. 2017;9. doi:10.1177/1847979017749063 (Year: 2017).*

*Primary Examiner* — Resha Desai
*Assistant Examiner* — Carter P Brockman
(74) *Attorney, Agent, or Firm* — Amin, Turocy & Watson, LLP

(57) ABSTRACT

A virtualized network function included in a mobile communication network may be capable of performing validation of sensor data. The sensor data may be generated by one or more sensors monitoring a tangible asset that is being transported between geographical locations. The sensor data may be received by the virtualized network function from an Internet-enabled device in communication with the mobile communication network. In some cases, a contract management application included in the virtualized network function may validate the sensor data based on one or more compliance thresholds describing a shipment condition of the tangible asset. Based on determining whether the sensor data indicates a compliant shipment condition for the tangible asset, the contract management application may modify a contract associated with the tangible asset.

19 Claims, 4 Drawing Sheets

(52) U.S. Cl.
CPC ............ *G06F 2221/2107* (2013.01); *G06F 2221/2111* (2013.01)

(56) References Cited

U.S. PATENT DOCUMENTS

| | | | |
|---|---|---|---|
| 10,091,270 B2 | 10/2018 | Fang | |
| 2016/0379163 A1* | 12/2016 | Johanson | G06Q 10/0833 705/333 |
| 2016/0379165 A1 | 12/2016 | Moakley | |
| 2017/0332199 A1* | 11/2017 | Elliott | H04W 4/023 |
| 2017/0344939 A1 | 11/2017 | Linton et al. | |
| 2017/0372262 A1 | 12/2017 | Haney | |
| 2018/0094953 A1 | 4/2018 | Colson et al. | |
| 2018/0137457 A1 | 5/2018 | Sachs et al. | |
| 2018/0144292 A1 | 5/2018 | Mattingly et al. | |
| 2018/0174097 A1 | 6/2018 | Liu et al. | |
| 2018/0174255 A1* | 6/2018 | Hunn | G06Q 10/10 |
| 2018/0189731 A1 | 7/2018 | Nossam | |
| 2018/0220278 A1* | 8/2018 | Tal | H04L 9/3297 |
| 2018/0357556 A1* | 12/2018 | Rai | G06N 20/00 |
| 2020/0026339 A1* | 1/2020 | Sebastian | H04W 52/0238 |
| 2020/0100115 A1* | 3/2020 | Skaaksrud | H04L 41/06 |

* cited by examiner

DATA VALIDATION IN A MOBILE COMMUNICATION NETWORK

TECHNICAL FIELD

This disclosure relates generally to the field of shipping logistics, and more specifically relates to validation of data received from sensors monitoring tangible assets during shipment.

BACKGROUND

Supply chain networks and logistical services provide shipping and storage services for tangible assets, such as physical goods that are shipped between locations. A customer, such as manufacturing company or other organization, may engage in a contract with a logistics service to provide shipment or storage, or both, of tangible goods that are moved from a source location, such as a supplier's facility, to the customer's location. In some cases, the contract may specify shipment conditions for the assets, such as a temperature range or security requirements.

In some conventional supply chain systems, sensors are placed with the tangible assets to establish whether shipment conditions are met during transit. The sensors may collect data regarding the shipment conditions. The conventional supply chain system may store the data locally, such as on a local storage device that is physically proximate to the sensors and tangible assets, such as with the same shipping container, and provide the stored data to a computing system of the customer at intervals, such as at data collection checkpoints during shipping (e.g., weighing stations or distribution centers). However, the interval of time between data collection checkpoints may be too long to prevent damage to the tangible assets, if a problem with the assets develops during the interval, such as a loss of temperature control in a container. In addition, a local storage device or data collection checkpoint may be damaged or otherwise compromised, resulting in lost data or misrepresented data (e.g., such as by tampering).

In some cases, conventional supply chain systems may also provide unvalidated sensor data to the computing system of the customer. The unvalidated sensor data may be provided without any verification of whether the sensor data indicates compliant shipping conditions of the tangible asset. In addition, the unvalidated sensor data may be provided without any verification of whether the sensor data is accurate.

It is desirable to develop techniques to receive data for tangible assets on a continuous basis, or without intervals between collection checkpoints. Also, it is desirable to develop techniques to validate the received data.

SUMMARY

According to certain implementations, sensor data may be received by a virtualized network function included in a mobile communication network. The sensor data may describe a condition of the tangible asset. An asset data repository in the virtualized network function may receive the sensor data from an Internet-enabled device that is in communication with the mobile communication network. The contract management application included in the virtualized network function may determine a contract corresponding to the sensor data and to the Internet-enabled device. The contract management application may validate the sensor data based on a comparison of the sensor data with a compliance threshold associated with the contract. In response to determining that the sensor data is outside of the compliance threshold, the contract management application may update the contract. In some cases, the contract management application may provide the updated contract to at least one computing system external to the mobile communication network.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
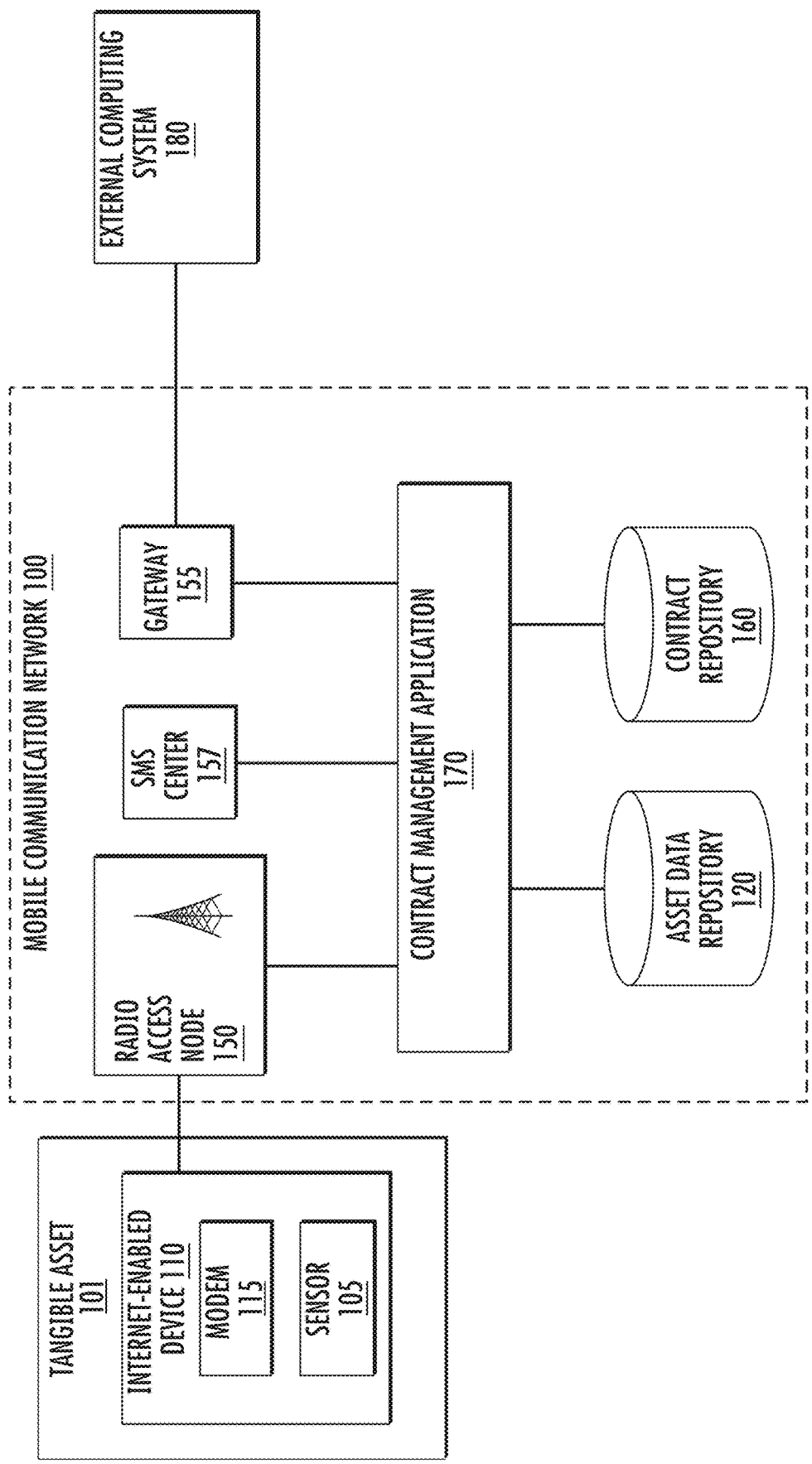
FIG. 1 is a block diagram depicting an example of a computing system capable of validating data for tangible assets.

As discussed above, conventional supply chain systems do not provide for short-term collection of sensor data for tangible assets. In addition, conventional supply chain systems do not include validation of sensor data prior to providing data to a customer. Certain implementations described herein provide for collection or validation of sensor data by one or more components of a mobile communication network that is capable of relatively fast communications (e.g., having a roundtrip latency of about 10 ms to about 100 ms) with an Internet-enabled device. In addition, certain implementations described herein provide for validation of the sensor data on the mobile communication network. In some cases, the sensor data is validated prior to receipt by an external computing system in communication with the mobile communication network.

As used herein, the term "supply chain system" refers to an organization or organizations that provide services related to logistics, such as transportation or storage of tangible assets. A supply chain system may include personnel, vehicles, storage facilities, or other related participants. In some cases, tangible assets that are transported or stored may include physical goods, such as (without limitation) manufacturing components, consumer goods, raw materials (e.g., lumber, concrete), fluids (e.g., water, oil, gases), or any other physical material that may be transported between geographical locations.

As used herein, the term "Internet-enabled device" refers to a device, such as an Internet-of-Things device ("IoT device"), that is capable of transmitting data via a network. An Internet-enabled device may be capable of transmitting data via a mobile communication network. In some implementations, the device may operate with little or no input from a human user. In some cases, Internet-enabled devices may be configured to receive information from other devices, such as from (without limitation) environmental sensors (e.g., temperature, light, humidity), fleet or vehicle sensors (e.g., speed, vibration, geographical location), cameras, security devices, or any other suitable device.

As used herein, the term "virtualized network function" ("VNF") refers to one or more virtual components that are implemented within a mobile communication network. A VNF may be implemented by one or more network devices that are included in a core network of the mobile communication network. In some cases, the VNF includes multiple virtual components, such as virtualized applications, virtualized storage, virtualized modules, or other suitable types of virtual components. In addition, operations and functions that are performed by a VNF may be executed within the mobile communication network. In some cases, multiple VNFs may be implemented by the mobile communication network, such as multiple instances of a VNF that are executed within the mobile communication network. For example, parallel instances of a VNF may operate on the mobile communication network, or a particular instance of a VNF may be instantiated, such as for a particular customer.

The following examples are provided to introduce certain features of the present disclosure. Referring now to the drawings, FIG. 1 depicts an exemplary system capable of validating data for tangible assets. Mobile communication network 100 may comprise a core mobile network that enables communication of mobile devices using an evolved packet core architecture on a long-term evolution standard ("LTE EPC network"), a general packet radio service ("GPRS") standard, a code-division multiple access ("CDMA") standard, or other suitable mobile network architectures or standards. The mobile communication network 100 may include one or more mobile communication nodes, such as radio access node 150, one or more short message service ("SMS") centers, such as SMS center 157, or one or more mobile communication gateways, such as gateway 155. In some cases, one or more of the gateway 155, the SMS center 157, or the radio access node 150 may communicate with each other or with other components of the mobile communication network 100. The radio access node 150 may be a mobile communications node (e.g., a "cell tower"), a wireless access point, or any other suitable type of communications node. Mobile devices, such as an Internet-enabled device 110, a personal mobile telephone, or any other suitable mobile device, may provide and receive data to and from the radio access node 150. In addition, the gateway 155 may communicate with one or more additional computing systems that are external to the mobile communication network 100. In some cases the mobile communication network 100 is configured to communicate with the additional external computing systems that are not included in the mobile network 100. For example, the gateway 155 may communicate with an external computing system 180. In addition, the gateway 155 may provide (or receive) data to (or from) the external computing system 180, such as data transmitted via the radio access node 150, or other components of the mobile communication network 100.

Additional systems may communicate via the mobile communication network 100. For example, one or more Internet-enabled devices, such as the Internet-enabled device 110, may communicate via the radio access node 150. The Internet-enabled device 110 may include components capable of communicating with the mobile communication network 100. For example, the Internet-enabled device 110 may communicate with the radio access node 150 via a modem 115. The modem 115 may include a mobile communications modem (e.g., a "cell modem") that operates using an LTE standard, a GPRS standard, a CDMA standard, or any other suitable mobile network communications modem technology or standard. The Internet-enabled device 110 may also include a subscription identification module ("SIM") card, or other suitable components. In addition, the Internet-enabled device 110 may have an authorization to communicate via the mobile communication network 100, such as an active mobile service subscription or account. In some cases, the Internet-enabled device 110 may attach to the mobile communication network 100 by establishing communications with the radio access node 150. Attachment to the mobile communication network 100 may include an exchange of identification information and/or security information between the Internet-enabled device 110 and the radio access node 150.

In some implementations, the mobile communication network 100 may include additional components, such as one or more of a contract management application 170, an asset data repository 120, or a contract repository 160. In some cases, the contract management application 170 and repositories 120 and 160 may be implemented on one or more network devices included in the mobile communication network 100, such as implementations executed on one or more servers, storage devices, or other suitable network devices. In addition, the contract management application 170 and repositories 120 and 160 may be implemented as virtualized network functions, such as virtual servers, virtual databases, or other suitable virtual systems, that are implemented within the mobile communication network 100.

The contract management application 170 may receive data from the Internet-enabled device 110, via the modem 115 and/or the radio access node 150. In some cases, the data describes one or more tangible assets that are associated with the Internet-enabled device 110. For example, a tangible asset 101 that is being shipped between locations, or stored at a location, may be monitored by one or more sensors, such as a sensor 105 that is included in (or otherwise in communication with) the Internet-enabled device 110. In some cases, the tangible asset 101 may be owned by, shipped by, or otherwise associated with an organization, such as an organization associated with the external computing system 180.

In some implementations, the contract management application 170 may receive sensor data, via the Internet-enabled device 110, that describes a condition of the tangible asset 101. For example, the sensor data may describe a temperature, a humidity level, an exposure to light, a geographical location, a security condition (e.g., locked/unlocked, weight), or any other suitable condition of the tangible asset 101. In addition, the contract management application 170 may validate the received data. Validation may be based on a data comparison, such as by comparing the received data to additional data stored in the asset data repository 120. In addition, validation may be based on a contractual criteria, such as by comparing the received data to a compliance threshold stored in the contract repository 160. In some cases, the validation may be performed by the contract management application 170 using information (e.g., asset data, contract criteria) that is stored on network devices included in the mobile communication network 100. In some cases, the contract management application 170 may perform the validation without receiving information via the gateway 155, such as without receiving information from the external computing system 180.

In some cases, validating the received sensor data by components and data that are included within the mobile communication network 100 may allow validation to be completed in a faster time as compared to validation by computing systems that are external to the mobile communication network 100. For example, the contract management application 170 may receive sensor data from the Internet-enabled device 110, via the radio access node 150, with relatively low latency (e.g., a latency of about 100 ms to about 500 ms). An external computing system in communication with the mobile communication network 100, such as the external computing system 180, may receive data from the Internet-enabled device 110, via the radio access node 150 and the gateway 155, with a relatively high latency (e.g., a latency of about 1 minute to about 3 minutes). In addition, the contract management application 170 may receive additional data, such as network data or contextual data, from components included in the mobile communication network 100. The radio access node 150, for example, may provide context data describing its own operating conditions, such as its geographical location, an ambient temperature, a power status, an error code, or other contextual information. One or more of the radio access node 150 or additional radio access nodes in the mobile communication network 100 may provide network data describing events on the network 100, such as communications between nodes, sessions with devices communicating (or requesting communication) with the network 100, levels of communication traffic on the network 100, or other network information. In some cases, the contract management application 170 may perform validation based on the additional data. For example, a temperature reported by the Internet-enabled device 110 may be validated based on temperature context data provided by the radio access node 150. In addition, session data (e.g., a record of communications with nodes on the network 100) reported by the Internet-enabled device 110 may be validated based on session network data provided by the radio access node 150 and additional nodes in the network 100. The external computing system 180 may lack access to the additional data from components included in the mobile communication network 100, and may be unable to perform validation based on such additional data. In some cases, validating sensor data based on additional information from components included in a mobile communication network may improve accuracy of the validation process and/or the validated data.

In addition, validating the received sensor data by components and data that are included within the mobile communication network 100 may increase security and/or reliability for the validated data. For example, data entering the mobile communication network 100 via the radio access node 150 may be encrypted, or otherwise protected, via one or more techniques indicated by mobile communications standards (e.g., LTE, GPRS, CDMA). Data included in the asset data repository 120 and the contract repository 160 may also be encrypted, or otherwise protected, via one or more of the indicated techniques. In some cases, the contract management application 170 may access data stored in the repositories 120 and 160 without receiving (or providing) information from (or to) an external computing system, such as via the gateway 155. Accessing data stored on the mobile communication network 100 may improve security or reliability of the accessed data by reducing a likelihood of receiving inaccurate or misrepresented data from an external computing system.

Based on the validation of the received data, the contract management application 170 may modify a contract that is stored in the contract repository 160. For example, the Internet-enabled device 110 may be associated with a tangible asset 101 that corresponds to a contract between parties, such as one or more of a supplier, a logistics service, or a customer. The contract may include one or more contractual criteria, such as a compliance threshold. In some cases, the contract management application 170 may perform the validation based on the criteria indicated by the contract. Based on the validation, the contract management application 170 may update the contract. For example, if the received data is outside of a compliance threshold, the contract may be updated to indicate shipment of a non-compliant (e.g., damaged, lost) tangible asset. In addition, the contract may be updated to indicate if a delivery window is changed, if replacement assets are to be shipped, if a payment for the non-compliant asset is changed, or other modifications. In some cases, the contract management application 170 may provide the modified contract, or data indicating the modifications, to the external computing system 180. For example, the external computing system 180 may be associated with an organization that is a party to the contract or otherwise associated with the contract.

Figure 2:
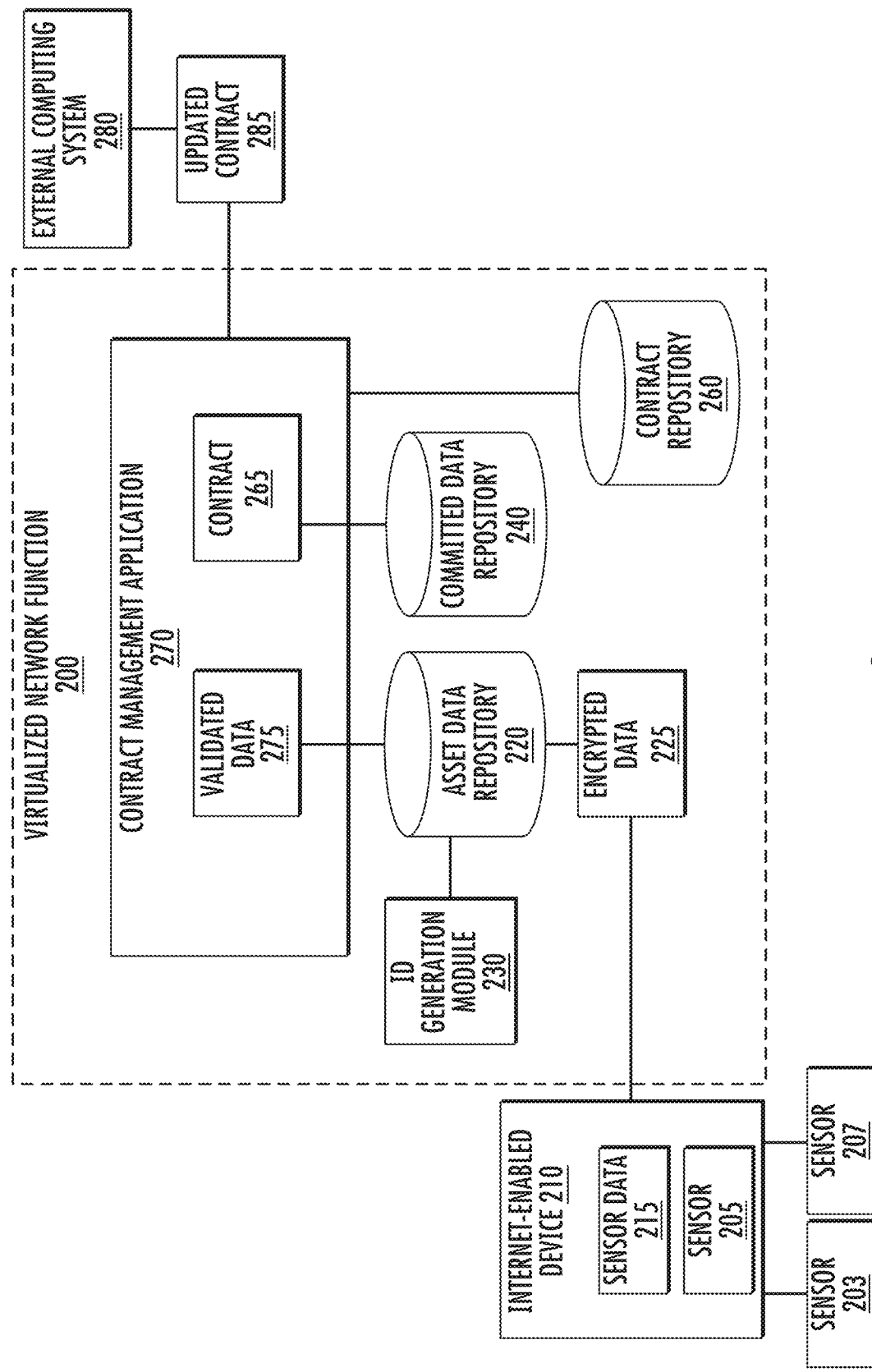
FIG. 2 is a block diagram depicting an example of a validation computing system implemented via virtualized network functions included in a mobile communication network.

FIG. 2 depicts a computing system that is capable of performing validation of sensor data. The validation computing system may include one or more components included in a mobile communication network, such as the mobile communication network 100. In some cases, the validation computing system is implemented via one or more virtualized network functions, such as a VNF 200. In some cases, components included within the VNF 200 may include virtual components, such as virtualized applications, virtualized storage structures and other virtualized modules of the validation computing system. The virtual components may be executed on one or more network devices that are included within the mobile communication network. In FIG. 2, operations and functions that are performed by the VNF 200 may be executed within the mobile communication network.

In some implementations, the VNF 200 is capable of communicating with an Internet-enabled device 210, or an external computing system 280, or both. The VNF 200 may be configured to communicate with the Internet-enabled device 210 via a radio access node included within the mobile communication network, such as the radio access node 150. For example, the VNF 200 may be configured to generate and send a short message service ("SMS") message via an SMS center included in the mobile communication network, such as the SMS center 157. The VNF 200 may send the SMS message to the Internet-enabled device 210 based on a determination that the Internet-enabled device 210 has not provided information in a threshold period of time (such as if the device is in a standby mode or outside of a coverage area). For example, the VNF 200 may send to the Internet-enabled device 210 an SMS message that includes one or more instructions for the device 210, such as a binary or text instruction directing the device 210 to revive from a standby mode, connect to the mobile communications network 100, provide sensor data 215, or perform other suitable actions. In addition, the VNF 200 may be configured to communicate with the external computing system 280 via a gateway included within the mobile communication network, such as the gateway 155.

In some implementations, the VNF 200 receives the sensor data 215 from the Internet-enabled device 210. The sensor data 215 may be generated by one or more sensors. For example, a sensor 205 that is included in the Internet-enabled device 210 may generate a portion (or all) of the sensor data 215. In addition, the Internet-enabled device 210 may be capable of communicating with one or more additional sensors, such as the sensors 203 or 207, that are associated with the tangible asset. In some cases, the additional sensors 203 or 207 may be external to the Internet-enabled device 210. The additional sensors 203 or 207 may generate additional portions of the sensor data 215.

The sensor data 215 may describe one or more conditions of one or more tangible assets (such as the tangible asset 101) that are associated with the Internet-enabled device 210. For example, a sensor 205 that monitors the tangible asset may provide the sensor data 215. The sensor 205 may monitor conditions of the tangible asset, including (without limitation) a temperature, a humidity level, an exposure to light, a geographical location, a security condition (e.g., locked/unlocked, weight), or any other suitable asset condition. The sensor 205 may generate the sensor data 215 based on the monitored conditions. In addition, the generated sensor data 215 may describe one or more of the conditions via, for example, electronic data that represents information about the conditions, such as text, numeric, logical (e.g., true/false), or other types of condition information. In some cases, the sensor data 215 may include information not intended for human interpretation, such as data structures or records. In addition, the sensor data 215 may include information identifying the Internet-enabled device 210, such as an IP address or MAC address.

The Internet-enabled device 210 may provide the sensor data 215 to the VNF 200. For example, a modem (such as the modem 115) that is included in the Internet-enabled device 210 may communicate with a radio access node (such as the node 150) that is included in a mobile communication network implementing the VNF 200. In some implementations, the sensor data 215 is encrypted as (or before) it enters the mobile communication network, such as in response to determining that the Internet-enabled device 210 has attached to the mobile communication network. For example, a communication between the modem of the Internet-enabled device 210 and the radio access node may be encrypted according to one or more mobile communications standards of the mobile communication network. In some cases, the VNF 200 receives encrypted data 225, which is based on the encryption of the sensor data 215.

In the VNF 200, the encrypted data 225 may be received by an asset data repository 220. The asset data repository 220 may be implemented as a virtualized component included in the VNF 200. The encrypted data 225 may be associated with a temporary ID that is generated for the encrypted data 225. For example, an identification generation module 230 that is included in the VNF 200 may create a temporary ID that encrypts, omits, or otherwise anonymizes the device ID of the Internet-enabled device 210. In some cases, generating a temporary ID and/or anonymizing the device ID may improve security of the sensor data 215 or encrypted data 225, such as by anonymizing the source of the data (e.g., the monitored tangible asset) or an associated contract or contract parties. In some cases, the asset data repository 220 may aggregate data that is associated with a particular ID, such as aggregating multiple sets of sensor data 215 that are received from the particular Internet-enabled device 210. The aggregated data may be associated with one or more temporary IDs. For example, the aggregated data may be associated with a particular temporary ID associated with the Internet-enabled device 210. In addition, the aggregated data may be associated with multiple temporary IDs that are associated with respective portions of data received from the Internet-enabled device 210 (e.g., portions of sensor data received at various times).

In some cases, the asset data repository 220 may be a repository for unvalidated sensor data. In addition the asset data repository 220 may be temporary repository for received sensor data. For example, the asset data repository 220 may store the encrypted data 225 for a relatively short period of time (e.g., from about 1 second to about 1 minute) as the encrypted data 225 is validated or otherwise analyzed. In addition, the asset data repository 220 is a long-term repository for received sensor data. For example, the asset data repository 220 may store the encrypted data 225 for a relatively long period of time (e.g., from about 1 hour to multiple days).

The contract management application 270 may access data that is stored in the asset data repository 220. In some cases, the contract management application 270 may access the stored data based on temporary IDs, such as the temporary ID associated with the encrypted data 225. In addition, the contract management application 270 may determine a group ID associated with the encrypted data 225. For example, the contract management application may determine a group ID to which the Internet-enabled device 210 is assigned, such as a group ID assigned to multiple Internet-enabled devices associated with multiple shipments, or to multiple Internet-enabled devices associated with multiple tangible assets in a particular shipment.

In addition, the contract management application 270 may access a contract repository 260. The contract repository 260 may be implemented as a virtualized component included in the VNF 200. In addition, the contract repository 260 may store information corresponding to one or more contracts describing shipment conditions of tangible assets. The contract information may include, without limitation, identification of tangible assets or services covered by the contracts, contractual criteria (such as one or more compliance thresholds associated with asset conditions), identification of parties to the contracts, financial or scheduling terms, or any other suitable contract information. The contract information may include criteria associated with activity of the Internet-enabled device 210, such as a threshold timer indicating a maximum time period between data uploads from the Internet-enabled device. In some cases, each contract that is stored by the contract repository 260 is associated with a group ID. For a particular contract, the group ID may correlate a set of Internet-enabled devices with the particular contract, such as by associating the temporary IDs of devices in the set with the group ID of the contract. In FIG. 2, the contract management application 270 may identify a contract 265, based on a particular group ID that is associated with the encrypted data 225 and also with the contract 265.

In some cases, the contract management application 270 may identify data stored in the asset data repository 220 with one or more contracts stored in the contract repository 260. For example, based on the group ID or one or more temporary IDs associated with the contract 265, the contract management application 270 may determine that data received from the Internet-enabled device 210 is associated with the contract 265. In addition, the contract management application 270 may access the encrypted data 225 based on a determination that the encrypted data 225 is associated with the contract 265.

In some implementations, the contract management application 270 may validate the encrypted data 225. In addition, the contract management application 270 may perform validation based on additional data associated with the contract 265, such as a compliance threshold. In addition, the contract management application 270 may validate the encrypted data 225 based on historical data, such as historical data previously received from the Internet-enabled device 210. In some cases, the historical data may be stored in the asset data repository 220. In addition, the historical data may be stored in an additional data repository that is included in the VNF 200, such as a committed data repository 240. The committed data repository 240 may be implemented as a virtualized component in the VNF 200.

In some cases, the contract management application 270 may generate validated data 275 based on the encrypted data 225. The validated data 275 may indicate one or more outcomes of the validation process by the contract management application 270. In addition, the contract management application 270 may determine whether or not the validated data 275 is within shipment conditions established by the contract 265. For example, the contract management application 270 may determine that the validated data 275 is outside of one or more compliance thresholds associated with the contract 265. Based on determining that the validated data 275 is outside of the compliance thresholds, the contract management application 270 may generate an updated contract 285. In some cases, the contract management application 270 may generate the updated contract 285 based on information stored in the contract repository 260. For example, the updated contract 285 may include revised terms indicating shipment of a non-compliant asset.

In some cases, the updated contract 285 is provided to one or more external computing systems, such as an external computing system 280, that are in communication with the VNF 200 included in the mobile communication network. The external computing system 280, for example, may be associated with a party to the contract 265 and/or to the updated contract 285. In some cases, the contract management application 270 may provide the updated contract 285 via a gateway included in the mobile communication network, such as the gateway 155. In addition, the updated contract 285 (or a copy) may remain in the VNF 200. For example, the updated contract 285 (or a copy) may be stored in the contract repository 260.

In some implementations, one or more contract management applications, such as the contract management application 270, are included in the VNF 200. Each of the contract management applications, including the contract management application 270, may be implemented as multiple virtualized components in one or more VNFs, such as the VNF 200. In some cases, each of the contract management applications may be implemented as a distinct virtual component in a respective VNF. For example, a first contract management application may be instantiated as a "slice" (e.g., a portion of computing resources) of the VNF 200. The first contract management application may include instantiations of one or more virtualized functions described in regards to FIG. 2, such as functions related to validation of data or interpreting and updating contracts. In addition, the first contract management application may be capable of accessing the repositories 220, 240, and 260. A second contract management application may be instantiated as an additional slice of the VNF 200, or as a slice on an additional VNF. The second contract management application may include additional instantiations of the virtualized functions described in regards to FIG. 2. In addition, the second contract management application may be capable of accessing the repositories 220, 240, and 260, or may be capable of accessing additional instantiations of an asset data repository, a committed data repository, or a contract repository.

In some cases, the first and second contract management applications may each be associated with a respective user of the mobile communication network that includes the contract management applications. For example, a particular contract management application may be associated with a particular organization that provides shipping and logistical services. In addition, a particular contract management application may be associated with a particular customer of shipping and logistical services. In some cases, each instantiated contract management application or VNF may be configured to communicate via a particular portion of the mobile communication network, such as via a particular access point name ("APN").

In some cases, instantiation of a contract management application or VNF for a particular user may improve efficiency or security for the instantiated slice. For example, a particular contract management application may be instantiated with features to improve efficiency for a shipping service that specializes in transportation of liquids. In addition, a particular contract management application may be instantiated with features to improve security for a manufacturer of luxury consumer goods.

Figure 3:
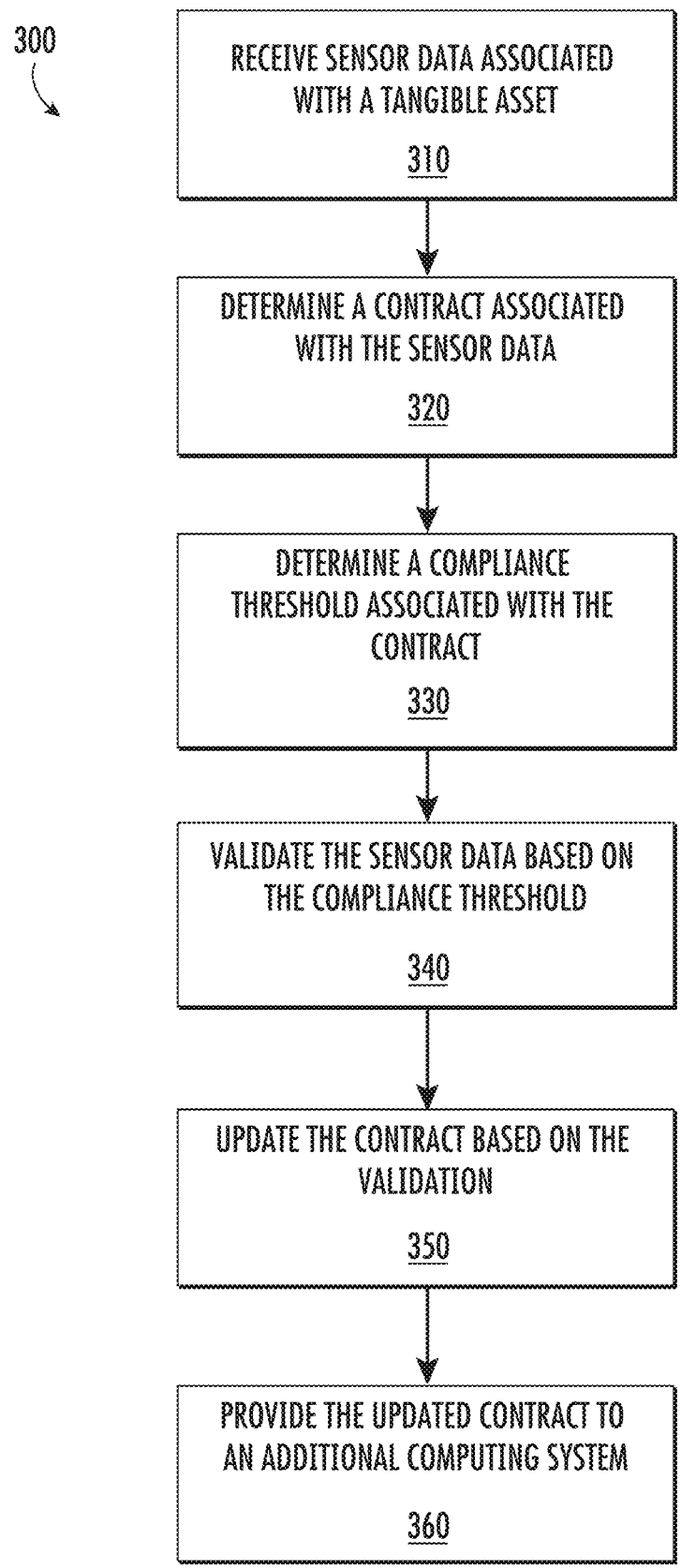
FIG. 3 is a flow chart depicting an example of a process for validating sensor data by a virtualized network function included in a mobile communication network.

FIG. 3 is a flow chart depicting an example of a process 300 for validating sensor data. In some implementations, such as described in regards to FIGS. 1-2, a computing device on a mobile communication network executing a virtualized network function implements operations described in FIG. 3, by executing suitable program code. For illustrative purposes, the process 300 is described with reference to the examples depicted in FIGS. 1-2. Other implementations, however, are possible.

At block 310, the process 300 involves receiving, such as by a VNF, sensor data associated with a tangible asset. For example, the VNF 200 may receive sensor data 215 from the Internet-enabled device 210. The received sensor data may describe one or more conditions of the tangible asset, such as the tangible asset 101. In some implementations, the received sensor data is associated with one or more of a device ID, such as an identification of the Internet-enabled device, or a temporary ID, such as a temporary ID created by the ID generation module 230. In some cases, the sensor data may be encrypted, such as the encrypted data 225. The received sensor data may be encrypted according to one or more mobile communication standards, or according to a key (or other security data) accessible by the VNF. In addition, the received sensor data may be stored on the VNF, such as in the asset data repository 220.

At block 320, the process 300 involves determining a contract associated with the received sensor data. In some cases, a contract management application operating on the VNF determines the associated contract based on one or more of the temporary ID or device ID. For example, the contract management application 270 determines a group ID to which the temporary ID belongs. In addition, contract management application 270 determines the contract 265 based on the group ID that is associated with both the temporary ID and the contract 265.

At block 330, the process 300 involves determining one or more compliance thresholds associated with the contract. For example, the contract management application 270 determines one or more compliance thresholds based on information associated with the contract 265, such as information stored in the contract repository 260. In some cases, each compliance threshold indicates a range of compliant shipping conditions for the tangible asset that is described by the received sensor data.

At block 340, the process 300 involves validating the sensor data based on the compliance threshold. For example, the contract management application 270 may perform the validation based on a comparison of the encrypted data 225 to the determined compliance threshold. In some cases, the validated sensor data may be determined to be compliant based on a determination that the sensor data is within the compliance threshold. In addition, the sensor data may be validated based on historical sensor data describing the tangible asset. For example, the contract management application 270 may perform the validation based on a comparison of the encrypted data 225 to historical sensor data stored in the committed data repository 240.

At block 350, the process 300 involves updating the contract based on the validation of the received sensor data. For example, the contract management application 270 may generate the updated contract 285 based on a comparison of the encrypted data 225 to one or more compliance thresholds associated with the contract 265. In some cases, an updated contract may be generated based on a determination that the received sensor data is outside of the compliance threshold. For example, the updated contract may indicate that the tangible asset described by the received sensor data has been shipped under non-compliant conditions.

At block 360, the process 300 involves providing the updated contract to an additional computing system, such as an additional computing system that is external to the mobile communication network. In some cases, the updated contract is provided to an additional computing system that is associated with an organization that is a party to the contract. For example, the contract management application 270 provides the updated contract 285 to the external computing system 280.

Validation of Data

Figure 4:
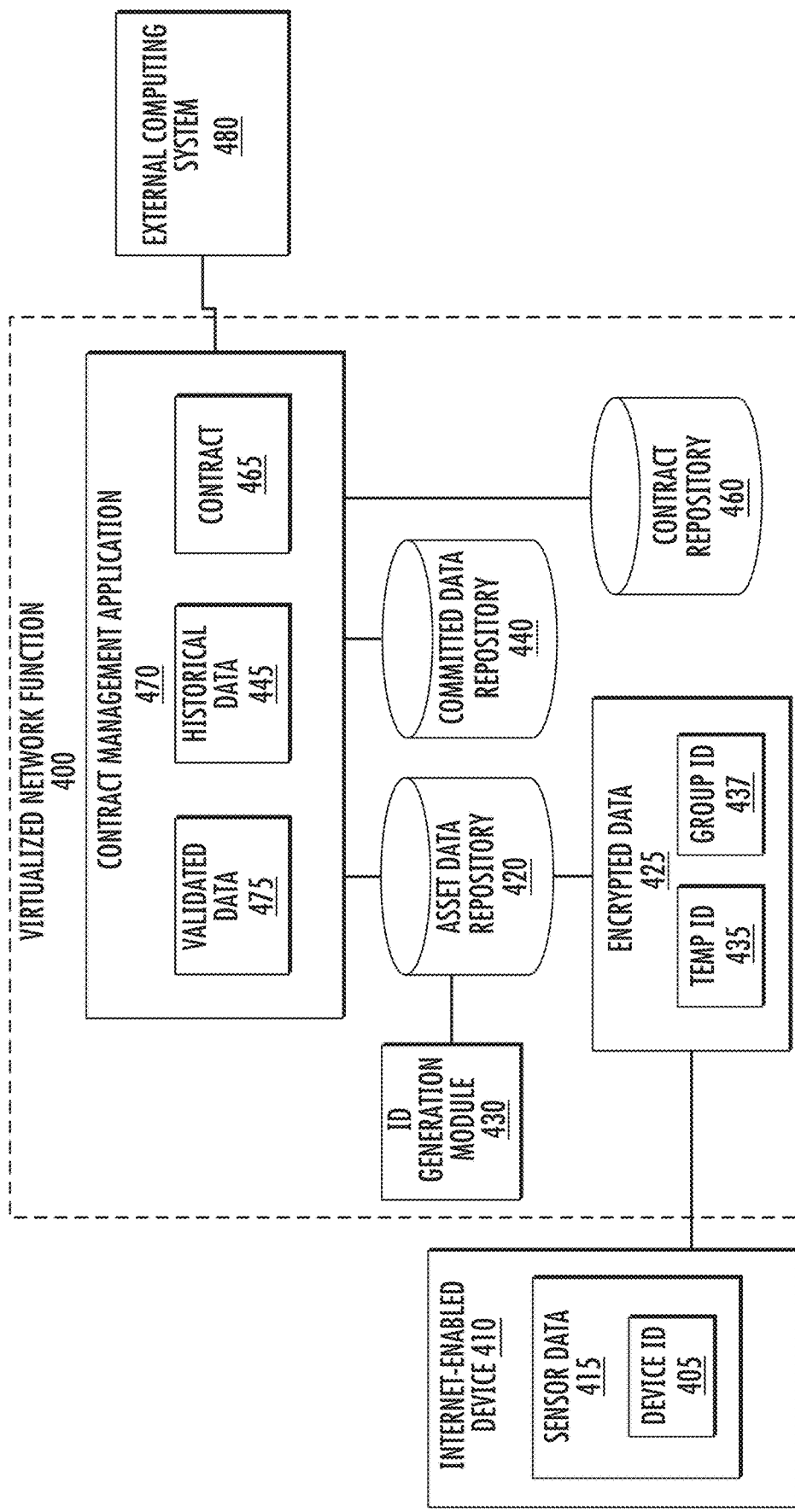
FIG. 4 is a block diagram depicting an example of a computing system capable of validating sensor data received from an Internet-enabled device that is attached to a mobile communication network.

FIG. 4 depicts a computing system that is capable of performing validation of sensor data received from an Internet-enabled device that is attached to a mobile communication network. The validation computing system is implemented via one or more virtualized network functions, such as the VNF 400, and may include one or more components included in the mobile communication network, such as the mobile communication network 100. In some cases, components included within the VNF 400 may include virtual components, such as virtualized applications, virtualized storage structures and other virtualized modules of the validation computing system. The virtual components may be executed on one or more network devices that are included within the mobile communication network. In FIG. 4, operations and functions that are performed by the VNF 400 may be executed within the mobile communication network.

In FIG. 4, one or more components of the virtualized network function 400 may be capable of communicating with an Internet-enabled device, such as the Internet-enabled device 410, that is capable of attaching to the mobile communication network in which the VNF 400 is included. The Internet-enabled device 410 may communicate with or attach to the mobile communication network via a radio access node of the mobile communication network, such as the radio access node 150. For example, the VNF 400 may receive sensor data 415 from the Internet-enabled device 410. The sensor data 415 may be generated by a sensor included in (or otherwise in communication with) the Internet-enabled device 410. In addition, the sensor data 415 may describe a condition of the tangible asset that is monitored by the sensor, such as the tangible asset 101. In some cases, the sensor data 415 includes (or otherwise indicates) a device ID 405 that identifies the Internet-enabled device 410 from which the sensor data 415 was received.

In some cases, the received sensor data 415 may be modified by one or more components of the mobile communication network that includes the VNF 400. For example, the sensor data 415 may be encrypted upon attachment of the Internet-enabled device 410 to the mobile communication network, such as according to one or more mobile communication standards. In addition, the received sensor data 415 may be encrypted by one or more components of the VNF 400. For example, the VNF 400 may encrypt the sensor data 415 based on security information associated with an asset data repository 420 that is included in the VNF 400. In some cases, the sensor data 415, or a portion of the sensor data 415, may be encrypted multiple times. For example, a communication between the Internet-enabled device 410 and a radio access node may be encrypted according to a mobile communication standard. In addition, sensor data (or portion thereof) that is included in such a communication may be encrypted again according to encryption information associated with a contract.

In some implementations, the asset data repository 420 may receive one or more of the sensor data 415 or encrypted data 425 that is based on the sensor data 415. In addition, the asset data repository 420 may receive a temporary ID 435 that is included in (or otherwise associated with) the encrypted data 425. For example, an ID generation module 430 that is included in the virtualized network function 400 may generate the temporary ID 435. In some cases, the temporary ID 435 may be generated based on the device ID 405.

In some cases, the encrypted data 425 is associated with a group ID 437. The group ID 437 may be determined based on one or more of the temporary ID 435 or additional information that is accessible by the VNF 400. For example, a contract management application 470 included in the VNF 400 may access the asset data repository 420, such as in response to an indication that the sensor data 415 has been received by the VNF 400. In some cases, the contract management application 470 may determine the group ID 437 based on the temporary ID 435. In addition, the contract management application 470 may access a contract repository 460 that is included in the VNF 400. In some cases, the contract management application 470 may determine a contract 465 that is also associated with the group ID 437. The contract 465 may be stored on the contract repository 460, or may be generated by the contract management application 470 based on contract information that is stored on the contract repository 460.

Based on one or more of the group ID 437 or the temporary ID 435, the contract management application 470 may validate the encrypted data 425. Validation of the encrypted data 425 may be performed to determine if the tangible asset described by the sensor data 415 is within shipment conditions established by the contract 465. For example, the contract management application 470 may determine a compliance threshold that is associated with the contract 465. The contract management application 470 may validate the encrypted data 425 based on a comparison with the compliance threshold, such as to determine whether the encrypted data 425 indicates whether the tangible asset is within a compliant range of temperatures, a compliant range of humidity, a compliant range of weights (e.g., indicating potential evaporation, potential theft), or other shipment conditions. In some cases, a contract management application (or other component) that is included in a VNF on a mobile communication network may validate data faster than a computing system that is external to the mobile communication network. For example, the contract management application 470 may be capable of performing validation within a relatively short period of time (e.g., between about 100 ms to about 500 ms) after the sensor data 415 is received by the mobile communication network. In addition, the contract management application 470 may be capable of performing validation based on additional information received from additional components in the mobile communication network. A computing system that is external to the mobile communication network, such as an external computing system 480, may be capable of performing validation within a relatively long period of time (e.g., between about 1 minute to about 3 minutes) after sensor data is received by the mobile communication network. In addition, the external computing system 480 may lack access to additional information from components in the mobile communication network, and may be unable to perform validation based on the additional information.

In addition, validation of the encrypted data 425 may performed to determine if the sensor data 415 includes accurate data, based on historical data 445 previously received from the Internet-enabled device 410. In FIG. 4, the historical data 445 may be stored on a committed data repository 440, but other implementations are possible. For example, the historical data 445 may be stored on an additional data repository included in the VNF 400, such as the asset data repository 420. Based on the historical data 445, the contract management application 470 may compare the encrypted data 425 against historical data associated with either the temporary ID 435 or the group ID 437. For example, the encrypted data 425 may indicate a first geographical location of the tangible asset. The contract management application 470 may compare the first geographical location against a second geographical location indicated by the historical data 445. Based on the comparison of the first and second geographical locations, the contract management application 470 may determine that the first geographical location is outside of an expected range. For example, if the first geographical location is a very large distance from the second geographical location (e.g., a greater distance than the capabilities of a vehicle transporting the tangible asset), the contract management application 470 may determine that the encrypted data 425 includes inaccurate geographical data.

In some implementations, the contract management application 470 may generate validated data 475 based on the validation of the encrypted data 425. The validated data 475 may include an indication of whether the tangible asset described by the encrypted data 425 is within shipment conditions established by the contract 465. In addition, the validated data 475 may include a signature, such as a cryptographic signature, that indicates one or more outcomes of the validation by the contract management application 470. For example, the validated data 475 may include a cryptographic signature indicating one or more of a validation result (e.g., compliant or non-compliant data, accurate or inaccurate data), an identification of the contract management application 470, a timestamp (e.g., indicating when validation was performed), or any other information relating to the validation process.

In FIG. 4, the validated data 475 may be stored in the committed data repository 440. In some cases, storing the validated data 475 includes committing the data 475 to the historical data 445. For example, the historical data 445 may include a cryptographically signed log of modifications to the historical data 445. In addition, committing the validated data 475 to the historical data 445 may include updating the cryptographically signed log to indicate the addition of the validated data 475. In some cases, the external computing system 480 may be capable of accessing one or more of the historical data 445 and the cryptographically signed log.

In some implementations, the validated data 475 may be provided to the external computing system 480, or to an additional computing network that is external to the mobile communication network on which the VNF 400 is implemented. For example, the validated data 475 may be validated with relatively low latency and/or based on information from the mobile communication network, as described elsewhere herein. In addition, the validated data 475 may be provided to the additional external computing network via a gateway included in the mobile communication network, such as the gateway 155. For example, the VNF 400 may provide the validated data 475 to a virtual computing network (e.g., a "cloud" network) that is associated with the external computing system 480, such as a cloud network to which the external computing system 480 has access. In some cases, the validated data 475 is received by one or more applications operating on the cloud network, such as a virtual application (e.g., a "cloud" application). The external computing system 480 may access the validated data 475 via the cloud application. In this example, the validated data 475 may be validated by the contract management application 470 with relatively low latency and/or based on information from the mobile communication network, prior to being provided to the cloud network associated with the external computing system 480. In some cases, the cloud application may store (or access) one or more additional contracts associated with the external computing system 480. In addition, the cloud application may update one or more of the additional contracts based on the validated data 475, and provide the updated additional contract to the external computing system 480.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, comprising:
in response to determining that an Internet-enabled device has not provided sensor data associated with a tangible asset that is in transit within a threshold period of time, sending, by network equipment comprising a processor, via a mobile communications network, an instruction that directs the Internet-enabled device to revive from a standby mode, connect to the mobile communications network, and obtain the sensor data from a sensor;
receiving, by the network equipment, via the mobile communications network, a communication comprising the sensor data from the Internet-enabled device, wherein the Internet-enabled device is associated with the tangible asset;
determining, by the network equipment, contract data representative of a contract corresponding to the sensor data and the Internet-enabled device;
determining, by the network equipment, a compliance threshold associated with the contract;
validating, by the network equipment, the sensor data, wherein the validating is based on a comparison of the sensor data with the compliance threshold;
in response to determining that the sensor data is outside of the compliance threshold, updating, by the network equipment, the contract resulting in updated contract data, wherein the determining that the sensor data is outside of the compliance threshold comprises:
comparing a first geographical location captured at a first time in the sensor data to a second geographical location captured at a second time in historical data associated with the Internet-enabled device, and
determining that a distance between the first geographical location and the second geographical location is greater than a capability of a vehicle transporting the tangible asset to travel within a time period between the first time and the second time; and
sending, by the network equipment, the updated contract data to a computing system associated with a party of the contract.

2. The method of claim 1, wherein the sensor data further comprises at least one of light exposure data, vibration data, humidity data, or temperature data.

3. The method of claim 1, wherein the contract data is stored by a contract repository.

4. The method of claim 1, further comprising:
determining, by the network equipment, based on an analysis of the contract data, the threshold period of time to receive the sensor data associated with the tangible asset.

5. The method of claim 1, further comprising generating, by the network equipment, a temporary identifier for the Internet-enabled device, wherein:
the temporary identifier anonymizes a device identifier of the Internet-enabled device,
the receiving the communication comprises receiving the communication with the temporary identifier and without the device identifier, and
the determining that the contract corresponds to the sensor data is based on the temporary identifier.

6. The method of claim 1, wherein the communication is encrypted according to a first encryption protocol associated with the mobile communications network, wherein the sensor data is encrypted according to a second encryption protocol specified in the contract data, and wherein the first encryption protocol is different from the second encryption protocol.

7. The method of claim 1, further comprising decrypting, by the network equipment, the sensor data based on an encryption key associated with the contract data.

8. The method of claim 1, further comprising, in response to validating the sensor data, committing, by the network equipment, the sensor data to a cryptographically signed log.

9. The method of claim 8, wherein the cryptographically signed log is stored in a committed data repository.

10. Network equipment, comprising:
a processor; and
a memory that stores executable instructions that, when executed by the processor, facilitate performance of operations, comprising:
in response to determining that an Internet-enabled sensor has not provided sensor data associated with a tangible asset that is in transit within a threshold period of time, sending, via a mobile communications network, an instruction that initiates the Internet-enabled sensor to revive from a standby mode, connect to the mobile communications network, and obtain the sensor data from a sensing element of the Internet-enabled sensor;
receiving, via the mobile communications network, a transmission comprising the sensor data from the Internet-enabled sensor, wherein the Internet-enabled sensor is associated with the tangible asset;
determining a compliance threshold associated with a contract corresponding to the Internet-enabled sensor;
validating the sensor data, wherein the validating is based on a comparison of the sensor data with the compliance threshold;
in response to determining, based on a result of the comparison, that the sensor data is outside of the compliance threshold, modifying the contract resulting in a modified contract, wherein the determining that the sensor data is outside of the compliance threshold comprises:
  comparing a first geographical location captured at a first time in the sensor data to a second geographical location captured at a second time in historical data associated with the Internet-enabled sensor, and
  determining that a distance between the first geographical location and the second geographical location is greater than a capability of a vehicle transporting the tangible asset to travel within a time period between the first time and the second time; and
  directing the modified contract to be sent to a device associated with a party of the contract.

11. The network equipment of claim 10, wherein the sensor data further comprises at least one of light exposure data, vibration data, humidity data, or temperature data.

12. The network equipment of claim 10, wherein the operations further comprise:
  determining, based on an analysis of the contract, the threshold period of time to receive the sensor data associated with the tangible asset.

13. The network equipment of claim 10, wherein the operations further comprise generating a temporary identification for the Internet-enabled sensor, and wherein:
  the temporary identification anonymizes a device identification of the Internet-enabled sensor,
  the receiving the transmission comprises receiving the transmission with the temporary identification and without the device identification, and
  the determining that the contract corresponds to the sensor data is based on the temporary identification.

14. The network equipment of claim 10, wherein the transmission is encrypted according to a first encryption protocol associated with the mobile communications network, wherein the sensor data is encrypted according to a second encryption protocol specified in the contract, and wherein the first encryption protocol is different from the second encryption protocol.

15. A non-transitory machine-readable medium, comprising executable instructions that, when executed by a processor of network equipment, facilitate performance of operations, comprising:
  in response to determining that a radio-enabled device has not provided sensor data associated with a tangible asset that is in transit within a threshold period of time, sending, via a mobile communications network, an instruction that causes the radio-enabled device to revive from a standby mode, connect to the mobile communications network, and obtain the sensor data from a sensor;
  receiving, via the mobile communications network, a message comprising the sensor data from the radio-enabled device associated with the tangible asset;
  identifying a contract corresponding to the radio-enabled device;
  determining a compliance threshold associated with the contract;
  validating the sensor data based on a result of comparing the sensor data with the compliance threshold;
  in response to the validating indicating that the sensor data is outside of the compliance threshold, modifying the contract, resulting in a modified contract, wherein the sensor data comprises a first geographical location captured at a first time, and wherein the validating comprises:
    comparing the first geographical location to a second geographical location captured at a second time in historical data associated with the radio-enabled device, and
    determining that a distance between the first geographical location and the second geographical location is greater than a capability of a vehicle transporting the tangible asset to travel within a time period between the first time and the second time; and
  sending the modified contract addressed to a party of the contract via a device associated with the party.

16. The non-transitory machine-readable medium of claim 15, wherein the sensor data further comprises at least one of light exposure data, vibration data, humidity data, or temperature data.

17. The non-transitory machine-readable medium of claim 15, wherein the operations further comprise:
  determining, based on an analysis of the contract, the threshold period of time to receive the sensor data associated with the tangible asset.

18. The non-transitory machine-readable medium of claim 15, wherein the operations further comprise generating a temporary identifier for the radio-enabled device, and wherein:
  the temporary identifier anonymizes a device identifier of the radio-enabled device,
  the receiving the message comprises receiving the message with the temporary identifier and without the device identifier, and
  the determining that the contract corresponds to the sensor data is based on the temporary identifier.

19. The non-transitory machine-readable medium of claim 15, wherein the message is encrypted according to a first encryption protocol associated with the mobile communications network, wherein the sensor data is encrypted according to a second encryption protocol specified in the contract, and wherein the first encryption protocol is different from the second encryption protocol.

* * * * *